US010661849B1

(12) United States Patent
Le

(10) Patent No.: US 10,661,849 B1
(45) Date of Patent: May 26, 2020

(54) ADJUSTABLE MOTORCYCLE BACKREST BRACKET

(71) Applicant: Billy Huu Le, Hayward, CA (US)

(72) Inventor: Billy Huu Le, Hayward, CA (US)

( * ) Notice: Subject to any disclaimer, the term of this patent is extended or adjusted under 35 U.S.C. 154(b) by 0 days.

(21) Appl. No.: 16/693,279

(22) Filed: Nov. 23, 2019

(51) Int. Cl.
*B62J 1/28* (2006.01)
*B62J 1/08* (2006.01)

(52) U.S. Cl.
CPC . *B62J 1/28* (2013.01); *B62J 1/08* (2013.01); *B62J 2001/085* (2013.01)

(58) Field of Classification Search
CPC ......................................................... B62J 1/28
See application file for complete search history.

(56) References Cited

U.S. PATENT DOCUMENTS

| 7,077,470 | B1 | 7/2006 | Strother | |
| 8,371,652 | B2* | 2/2013 | Revell | B62J 7/08 280/288.4 |
| 8,500,195 | B2 | 8/2013 | Smith | |
| 8,905,474 | B2 | 12/2014 | Parvey | |
| 9,957,010 | B2* | 5/2018 | Roulund | B62J 1/28 |
| 2008/0084097 | A1 | 4/2008 | Botting | |
| 2013/0214569 | A1* | 8/2013 | Parvey | B62J 1/28 297/215.12 |
| 2019/0322195 | A1* | 10/2019 | Chang | B60N 2/2245 |

OTHER PUBLICATIONS mustangseats.com, "Driver Backrest Kit for Harley-Davidson FL Touring" [Date accessed Jul. 16, 2019]: https://www.mustangseats.com/products/5801/driver-backrest-kit-for-harley-davidson-fl-touring?color=black&style=chrome-studded&parttype=driver-backrest-kit.

* cited by examiner

*Primary Examiner* — Timothy J Brindley
(74) *Attorney, Agent, or Firm* — Bonita Singh; John D. Houvener; Bold IP, PLLC

(57) ABSTRACT

The present invention is directed to an adjustable motorcycle backrest assembly that allows adjustment of the height and tilt of a backrest. The assembly includes a mounting bracket configured to conform to and fit between the driver's seat and the front edge of a passenger's seat. The height and tilt adjustable portion of the assembly slides into the mounting bracket and includes the means to slide the adjustable assembly upward and downward. A hinged clamp positioned at the top of the sliding assembly along with a tilting bracket provide the mechanism to adjust the tilt of the backrest. Loosening and tightening of a single bolt allows adjustment of both the height and tilt of the motorcycle backrest.

20 Claims, 13 Drawing Sheets

ADJUSTABLE MOTORCYCLE BACKREST BRACKET

TECHNICAL FIELD

The technical field generally relates to motorcycles and, more particularly, to adjustable backrest assemblies for motorcycles.

BACKGROUND

Motorcycle riding has become a popular means of transportation and recreation. It has been increasing in recent years and has brought on the availability of accompanying accessories including items that can be attached to the motorcycle or worn by the rider. To that extent, motorcycle enthusiasts and manufactures have sought to find ways to increase the comfort of the rider. In particular, it is desirable to have motorcycles equipped with a backrest for the rider to provide comfort and ease the fatigue of riding long distances.

Several approaches have been taken to incorporate a backrest to a motorcycle. Some backrest assemblies allow the height and the backward travel angle of the backrest pad to be adjusted, however, tools are required to perform the adjustments. Another aftermarket backrest available allows height adjustment or removal of the backrest from the motorcycle without the use of tools. However, the height adjustment is by means of a ball-type detent. Such a detent allows manual adjustment of the backrest height from one position to another, but does not provide positive locking of the backrest in a particular position. Another attempt at providing a backrest includes an adjustable supporting bracket for a backrest that may be disposed and slides between a mounting bracket, however it requires a retractable spring plunger to adjust and lock the height into place.

The prior art does not address the need of a motorcycle accessory for a touring motorcycle, in particular, of a custom bracket that features the backrest assembly which satisfies the riders need to adjust the height and tilt of the backrest with ease. The present invention addresses the need.

SUMMARY

The presently disclosed device is an adjustable backrest apparatus for adjusting the height and tilt of a backrest of a motorcycle.

In a preferred embodiment, the adjustable backrest apparatus includes an adjustable assembly that engages with a mounting bracket. The mounting bracket is configured to rest on a motorcycle frame and fender, and is fastened to the motorcycle frame to hold the mounting bracket in place. The mounting bracket receives the adjustable assembly comprised of a bolt, a hinged clamp which holds a splined shaft, a tube and a threaded jam rod. The hinged clamp has an aperture on the top that runs through the opposing side, such that the bolt slides through to hold the hinged clamp on top of the tube. The bolt traverses the tube and exits the lower end of the tube, where it threadably connects to threaded jam rod.

The hinged clamp has a top member and a bottom member joined by a hinge. The semi-circular cut outs in the top and bottom members of the hinged clamp form an aperture which extends across the two members within which a splined shaft sits. The round aperture is preferably wide enough to comfortably fit and engage with the splined shaft. The two ends of the splined shaft extend out on each side of the hinged clamp. The top member of the hinged clamp has grooves and the bottom member of the hinged clamp is smooth.

The assembly further includes a tilting bracket that is affixed to the backrest and allows the backrest to tilt. The tilting bracket is placed such that it surrounds the hinged clamp on three sides with the two parallel sides having apertures through which pass the portions of the spline shaft that extend out and past the sides of the hinged clamp.

The presently disclosed adjustable backrest apparatus provides a method by which the height and tilt of the backrest can be adjusted. The method includes loosening a bolt that holds the hinged clamp, tube, and threaded jam rod in place; adjusting the height of the backrest and/or the tilt position of the backrest; and then tightening the bolt and thereby hold the adjusted backrest in place.

The presently disclosed adjustable backrest apparatus for adjusting the height and tilt of a backrest of a motorcycle is further described in the attached drawings and detailed description below.

DETAILED DESCRIPTION

Figure 1A:
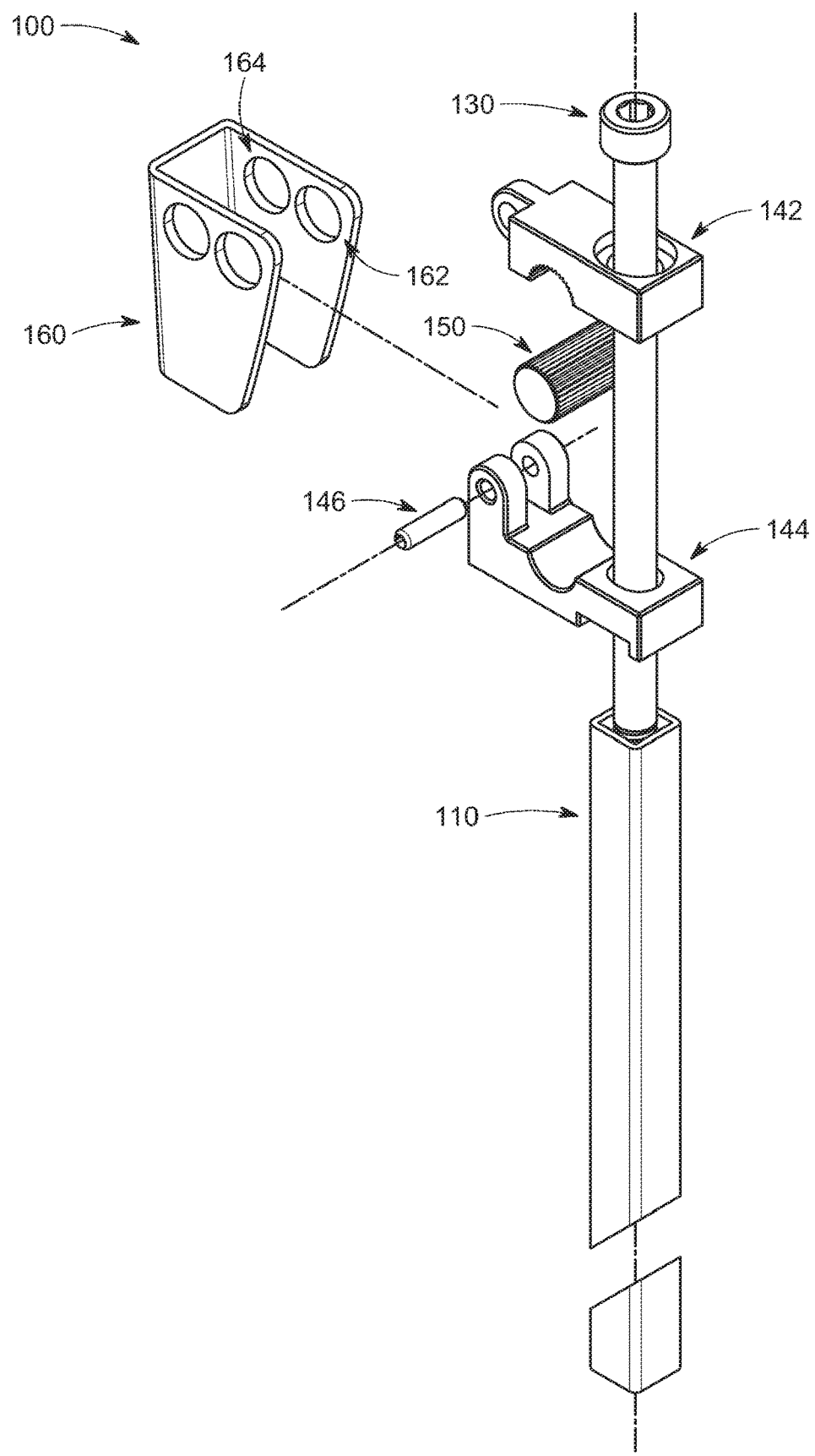
FIG. 1A illustrates an exploded view of an adjustable clamp and tube.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

The following description provides preferred exemplary embodiments only, and is not intended to limit the scope, applicability, or configuration of the invention. The following description of the preferred exemplary embodiment will provide those skilled in the art with an enabling description for implementing a preferred exemplary embodiment of the invention. It being understood that various changes may be made in the function and arrangement of elements without departing from the scope of the invention as set forth in the claims The presently disclosed device enables a user to adjust the backrest of a motorcycle. The device may be used to enable the up and down movement of the backrest and also enable the backrest to tilt back and forth, essentially allowing the rider to adjust the height of the backrest and the tilt to suit the comfort of the rider. The device includes a mounting bracket configured to conform to and fit between the driver's seat and the front edge of a passenger's seat. The mounting bracket forms the base or foundation. The mounting bracket may be fashioned from a sufficiently strong material which may include, but is not limited to, steel, aluminum, metal alloys, plastics, resins, and combinations thereof. The mounting bracket is comprised of two bracing pieces, a front mounting member, which may be fashioned as a flat longitudinal plate on the front side of the bracket which has apertures to allow bolts to secure the bracket to the frame of a motorcycle and a rear mounting bracket, which may also be fashioned as a flat plate, and is connected to the front mounting member through a connecting member. The rear mounting member sits against the fender of the motorcycle. The rear mounting member may have a bottom surface comprised of a material to prevent the fender from getting scratched. For example, such materials include, but are not limited to, rubber, plastics, resins, foam, and combinations thereof. The front mounting member has a hollow member that extends upward and away from the front mounting member. The hollow member may also be referred to as a receiving shaft. The receiving shaft is fashioned as an elongated hollow tube which may have a cross section of any shapes including, but not limited to, square, rectangular, circular, oval, triangular, trapezoidal, polygonal (such as pentagonal, hexagonal, and so forth). The receiving shaft is designed to receive an adjustable assembly for the backrest.

In a preferred embodiment, a hollow rod may be a part of the adjustable assembly. In this preferred embodiment, the hollow rod may be an SQ tube. The SQ tube may be fashioned from a strong metal such as that metal used for the mounting bracket. The SQ tube may have the same geometric shape as the mounting bracket receiving shaft such that SQ tube may be positioned within the receiving shaft of the mounting bracket and may be characterized as sliding up and down to adjust the height. A hinged collar is arranged on top of the SQ tube and has an opening that is smaller than the opening of the SQ tube so that the hinged collar rests on top of the SQ tube. A long bolt, which may be an M8 bolt is placed through a protrusion or hole that extends through the hinged collar into the SQ tube. Other long bolts may be used. The top end of the M8 bolt has a head that provides a stop guard to prevent the hinged collar from coming upwards. The bottom end of the M8 bolt extends through the SQ tube and exits through the bottom end to thread into a threaded jam rod. The arrangement of the M8 bolt through the SQ tube and the threaded jam rod may extend a substantial length of the receiving shaft of the bracket.

The hinged collar is fashioned with a circular opening that runs horizontally through a portion of the top and bottom members of the hinged clamp. Preferably, a splined shaft is positioned between the circular opening and horizontally with equal portions extending out on each end. The hinged collar acts as a fastening member for the splined shaft. Preferably, the opening in the top member may be characterized with teeth or grooves and the bottom member may be characterized as being smooth. By having those characteristics in the hinged collar, the splined shaft may be easily rotated when the hinged clamp is loosened and subsequently held in place with the grooves when tightened.

A tilting bracket is fashioned so it may be positioned through the extended ends of the splined shaft on each side of the hinged collar. The tilting bracket may be fashioned from a substantially strong material which may be the same material as the mounting bracket. The tilting bracket is positioned and connected to the back end of a backrest by any acceptable means including and not limited to bolts and welding. The backrest is fashioned with a front end and a back end. The front end is where the user rests the back while sitting in the seat and may be made of any material known in the arts. The back end of the backrest includes a plate preferably made of and not limited to metal or other acceptable materials known in the arts. The plate on the back end juts out near the bottom of the backrest with a long tube like opening where the tilting bracket with the hinged collar may be placed within and attached to the backrest. This backrest is included in all the other embodiments of the adjustable assembly discussed below.

In this preferred embodiment, the backrest may be adjusted upward or downward and may also be tilted to be more upright or angled. The adjustment assembly includes the M8 bolt arranged through a hinged collar, the SQ tube, and the threaded jam rod. The adjustment assembly is preferably positioned within the receiving shaft of the mounting bracket. By having the adjustment assembly positioned and arranged as such, the M8 bolt may be used as the means to tighten and loosen the threaded jam rod by turning clockwise or counter-clockwise. Loosening may be characterized by the threaded jam rod in a non-pivot position, which allows the adjustment assembly to slide upward or downward in the receiving shaft and thus position at the desired height. Tightening may be characterized by the threaded jam rod in a pivot position, such that it may not allow the adjustment assembly to slide. Preferably, loosening the M8 bolt also loosens the hinged collar, such that the hinged clamp may operate to open at the hinge and loosen the grip on the splined shaft. By having the splined shaft loosened within the hinged collar, the splined shaft may be rolled within the protrusion to subsequently adjust the tilt of the backrest which is connected to the tilting bracket positioned on the splined shaft.

In an alternate embodiment, the hinged collar is substituted for a small tube, preferably fashioned from the same metal and shape as the SQ tube. Other embodiments for the small tube may include and is not limited to a small solid bar. The small tube may be positioned on a flat surface near the top end of the SQ tube. The M8 bolt is preferably positioned directly on and through the top opening of the SQ tube such that the head of the bolt rests on the top and the bottom end of the M8 bolt is screwed into the threaded jam rod. The small tube is fashioned with two circular openings, one opening near the top above the M8 bolt on the side that runs parallel to the SQ tube, and the second opening on the sides perpendicular to the first opening. The tilting bracket is positioned along the sides of the small tube such that the small tube sits between the tilting bracket. The tilting bracket may be mounted and held in place by a bolt or other attachment means that may be positioned through the second opening in the small tube. The tilting bracket is positioned such that it may pivot at the attachment site. An M6 bolt is positioned through the first opening such that the end of the M6 bolt rests against the inside surface of the tilting bracket which is mounted to the backrest. By having the M6 bolt rest against the inside surface of the tilting bracket, the M6 bolt may be the means by which the backrest is tilted backward or forward. Turning the M6 bolt clockwise or anti-clockwise moves the M6 bolt inward toward the tilting bracket or outward away from the tilting bracket, such that the tilting bracket moves along with the M6 bolt to rest against the end of the M6 bolt. The upward and downward movement of the backrest follows the description above using the M8 bolt.

In an alternate embodiment, the receiving shaft of the mounting bracket is substituted with a receiving shaft that has two M6 bolts positioned in holes on opposite sides of each other near the top of the receiving shaft. These two M6 bolts are preferably placed on the sides which will not face the front or back of the motorcycle. A long tube which may be substantially similar to the length and complementary in shape to the receiving shaft may be positioned within the receiving shaft. The long tube may be fashioned of any substantially strong material and may be solid or hollow, and be of any length that allows the tube to sit within the receiving shaft stably and provide the length to move the backrest to the preferred position. The M6 bolts on the receiving shaft may be the means by which the long tube is adjusted in the upward and downward position by sliding up or down. The long tube is held in place by the M6 bolts pushing against it on opposite sides. Loosening the M6 bolts allows the long tube to be moved within the receiving shaft. The small tube with the tilting bracket as described in the above embodiment will be attached to the top end of the long tube and function in substantially the same manner as described in the above embodiment.

Figure 1B:
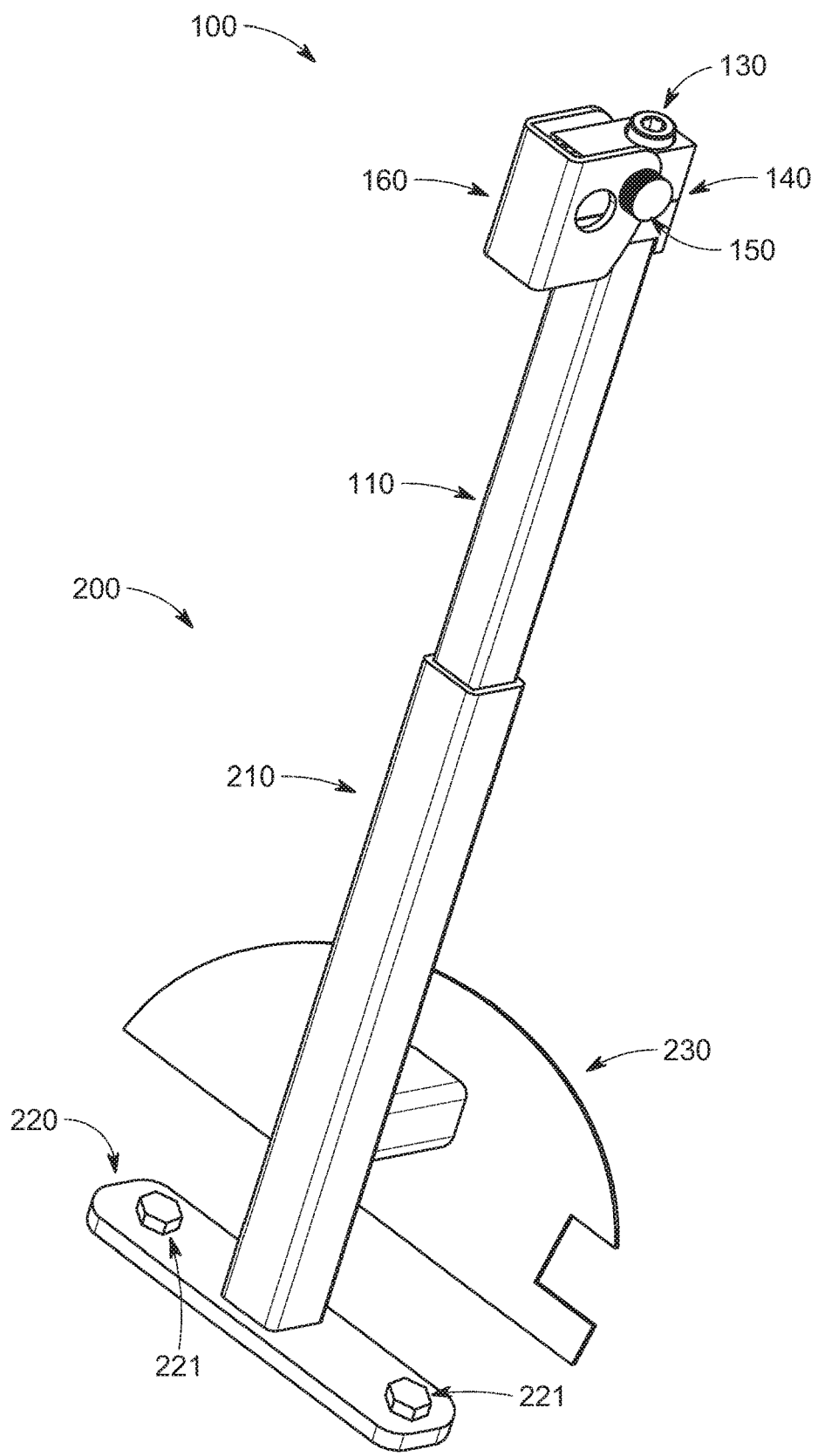
FIG. 1B illustrates a perspective view of a mounting bracket and assembled adjustable clamp and tube inserted within mounting bracket.

Referring now to FIGS. 1A, 1B, 2, 3, and 4, a preferred embodiment of the presently disclosed backrest adjustment assembly is shown. In the preferred embodiment, an improved backrest assembly includes a mounting bracket 200 and an adjustable clamp and tube 100. The mounting bracket 200 forms a support structure for which additional elements of the invention may be attached. As illustrated in FIG. 1B, the mounting bracket 200 may include a receiving shaft 210 which is an elongated hollow tube designed to receive the additional elements of the invention. The mounting bracket may also include two bracing pieces, a flat longitudinal plate 220 and a wider plate 230, which act to secure the mounting bracket to the motorcycle. The flat longitudinal plate 220 may be integrated on the front side of the bracket and may have apertures 221 to allow bolts to secure the bracket to the frame of a motorcycle. The wider plate 230 may be integrated on the back side of mounting bracket 200 opposite from the first plate and may rest against the fender of the motorcycle. The wider plate 230 may have a bottom surface comprised of a material to prevent the fender from getting scratched.

Figure 2:
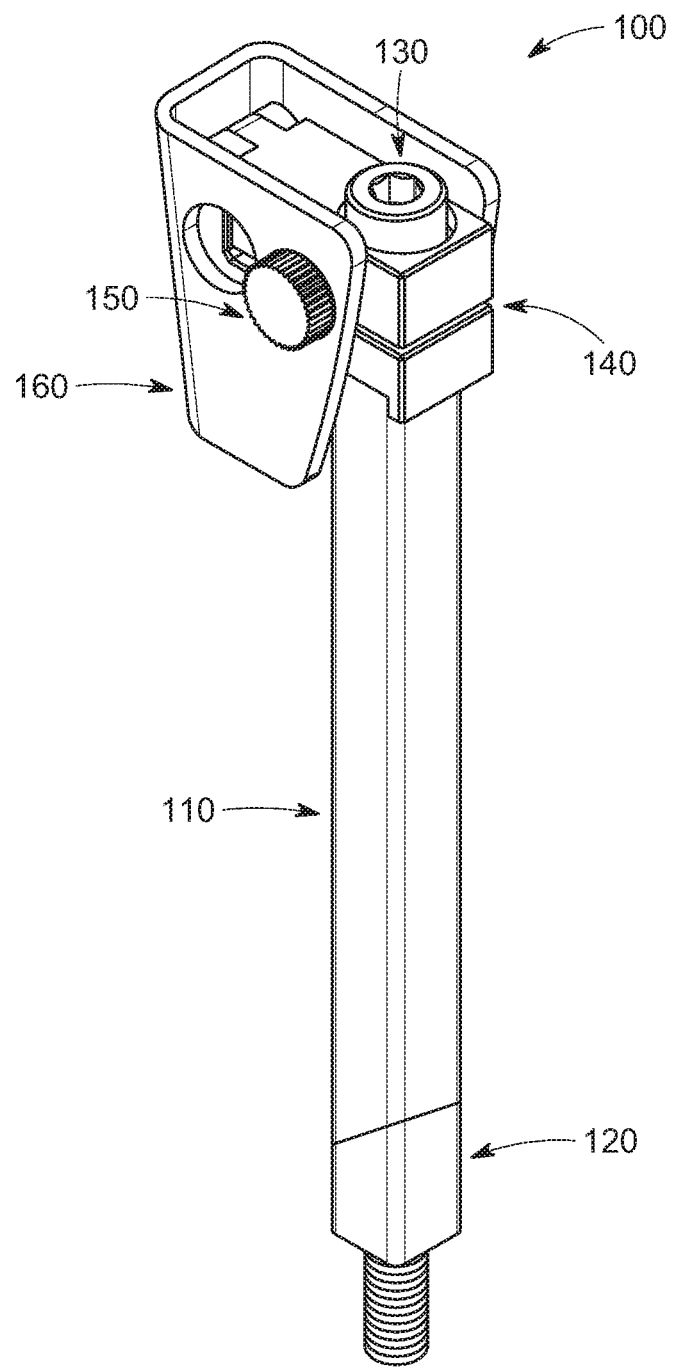
FIG. 2 illustrates a perspective view of an assembled adjustable clamp and tube.
Figure 3:
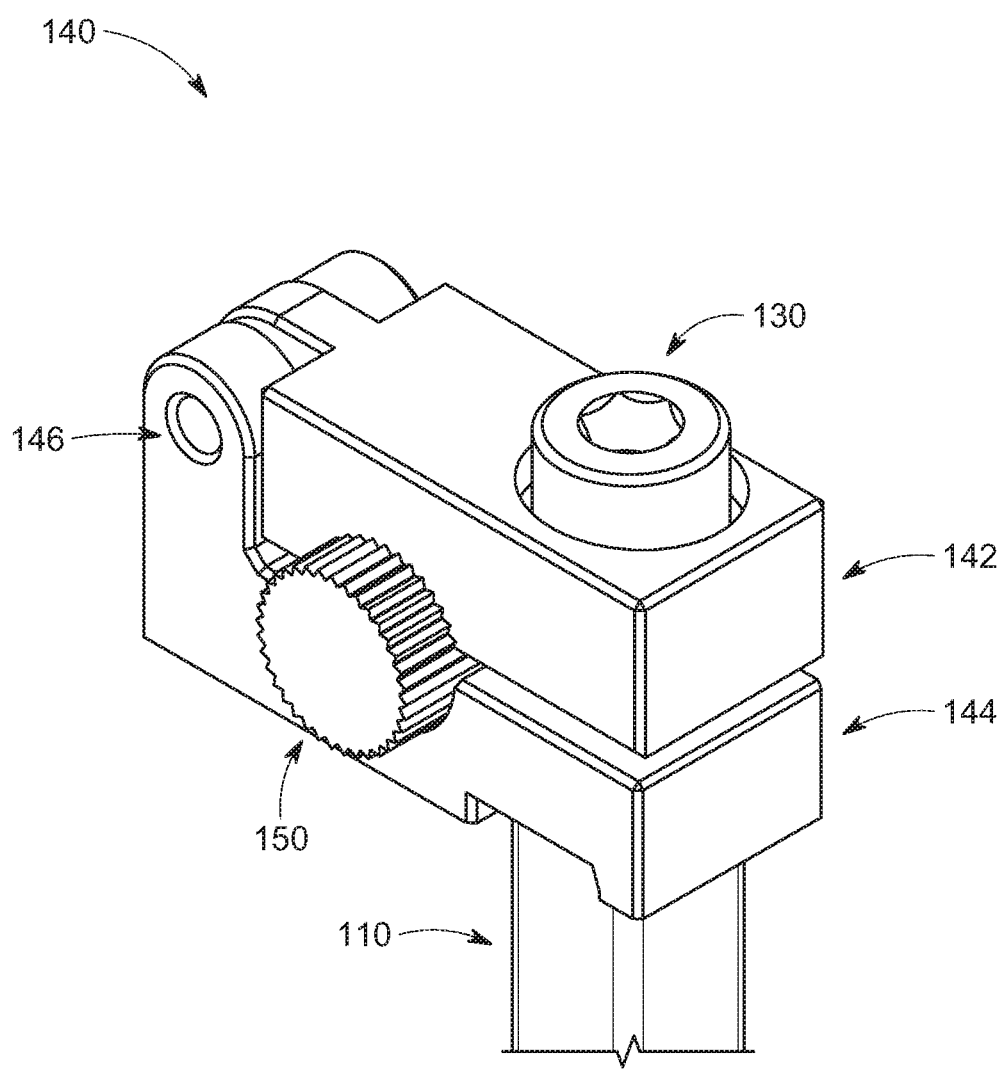
FIG. 3 illustrates a perspective view of a hinged collar assembly.

FIG. 1A shows an exploded view of the adjustment clamp and tube 100 which may include an SQ tube 110, a bottom member of hinged collar 144 and a top member of hinged collar 142, which may be arranged over the SQ tube 110. An M8 long bolt 130 may be placed through apertures in the top member of hinged collar 142, bottom member of hinged collar 144, and through the SQ tube 110 such that the bottom hinged member 144 sits securely on the top of the SQ tube 110 (as shown in FIG. 3.) The top and bottom hinged members 142, 144 have a semi-circular opening that runs the width of the members. A splined shaft 150 is arranged to sit in the circular opening between the top hinged member 142 member and the bottom hinged member 144, and a pin 146 may be used to integrate and secure the two hinged members together. The pin 146 may be characterized by a rivet, screw, or like fastener. The top end of the M8 long bolt 130 has a head that provides a stop guard to prevent the top member of hinged collar 142 from coming upwards (as shown in FIG. 3.) The bottom end of the M8 long bolt 130 extends through the SQ tube 110 and exits to thread into a threaded jam rod 120 (as shown in FIG. 2).

Figure 5:
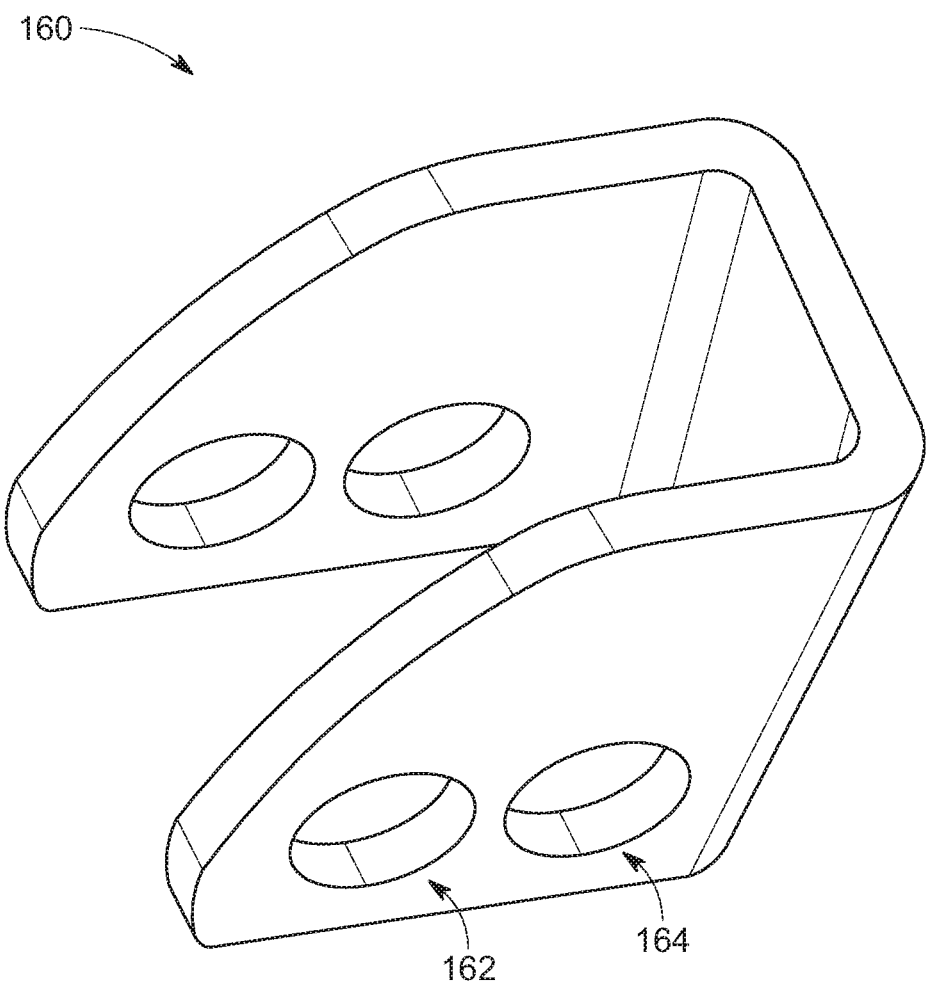
FIG. 5 illustrates a perspective view of a tilting bracket.

A tilting bracket 160 is integrated to fit into the adjustment clamp 100. Referring to FIG. 5, the tilting bracket 160 is ideally fashioned from a single piece of a rigid material, such as metal, that may be fashioned to form three sides, wherein the metal is bent with two sides parallel to each other with one open end. The two parallel sides each have at least two apertures 162 and 164. Referring back to FIGS. 1A to 2, at least two apertures 162 and 164 are configured such that they may receive the splined shaft 150. The two parallel sides of the tilting bracket 160 envelop the top and the bottom hinged collars 142, 144 by moving the open end of the tilting bracket over the hinged collars such that the closed end of the tilting bracket 160 rests against the end of the hinged collar which is secured by the pin 146. Either aperture 162 or 164 may be used depending on preferred distance of the seat back relative to the front of the motorcycle.

Referring to FIG. 1B, in the preferred embodiment, the mounting bracket 200 is shown arranged with the adjustable clamp and tube 100 slid inside. The M8 long bolt 130, SQ tube 110, and the threaded jam rod 120 portion of the assembled adjustable clamp and tube 100 slide into the receiving shaft 210 of the mounting bracket 200. The arrangement of the M8 bolt through the SQ tube and the threaded jam rod may extend a substantial length of the receiving shaft of the mounting bracket.

Figure 4:
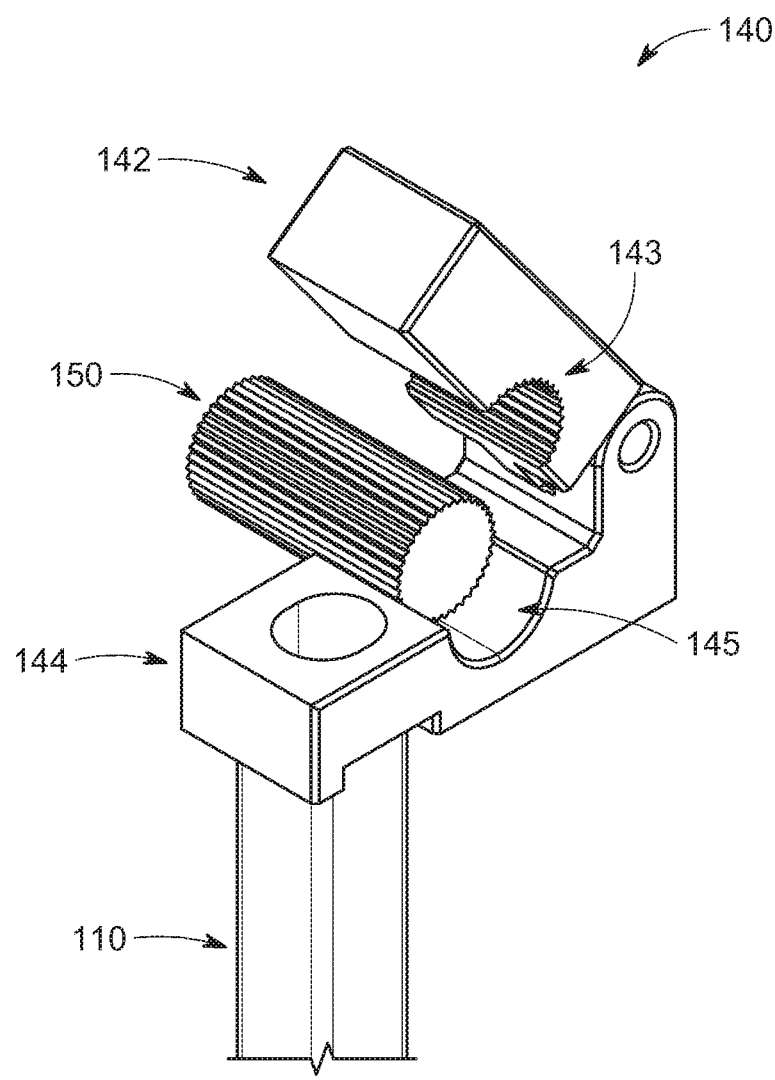
FIG. 4 illustrates a perspective view of an open hinged collar assembly.

FIG. 4 shows a closer view of the hinged collar assembly 140 of the preferred embodiment. The top hinged member 142 is shown secured to the bottom hinged member 144 with the circular apertures or openings cut through the width of the hinged members. The top aperture 143 is cut into the top hinged member 142 and is ideally provided with grooves or teeth to substantially accommodate the splines on the splined shaft 150. The bottom aperture 145 is shaped into the bottom hinged member 144 and is preferably smooth. Together, the top and bottom apertures 143, 145 when closed make a circular opening to preferably position the splined shaft 150. The grooves or teeth in the top aperture 143 and the smooth bottom aperture 145 allow for the splined shaft to rotate when the hinged clamp is open because of the smooth bottom aperture and typically provide for securely holding the splined shaft in position by aligning the grooves of the top aperture with the splines of the shaft when the hinged clamp is tightened.

Figure 6A:
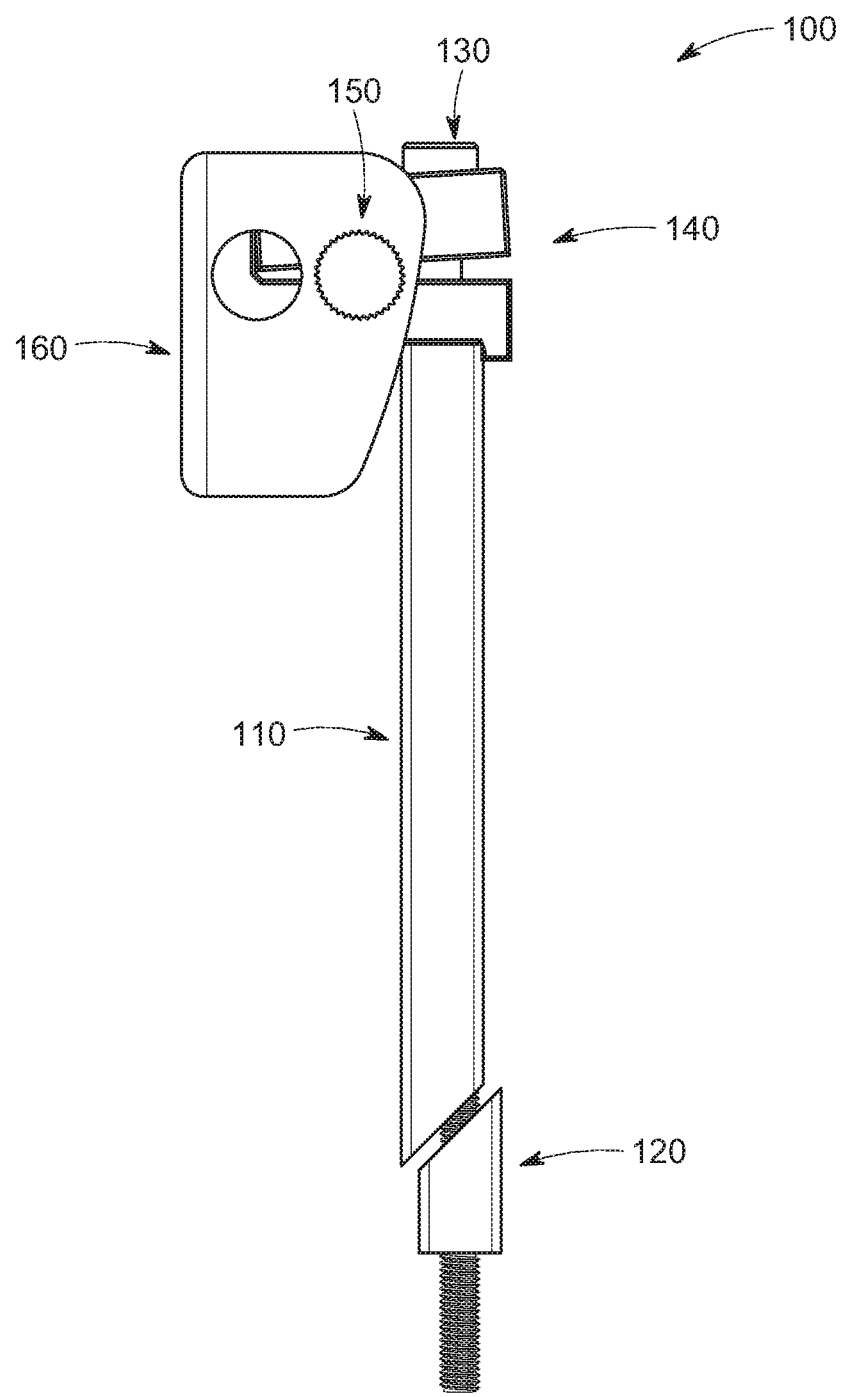
FIG. 6A illustrates a perspective view of an assembled adjustable clamp and tube in a tightened position.
Figure 6B:
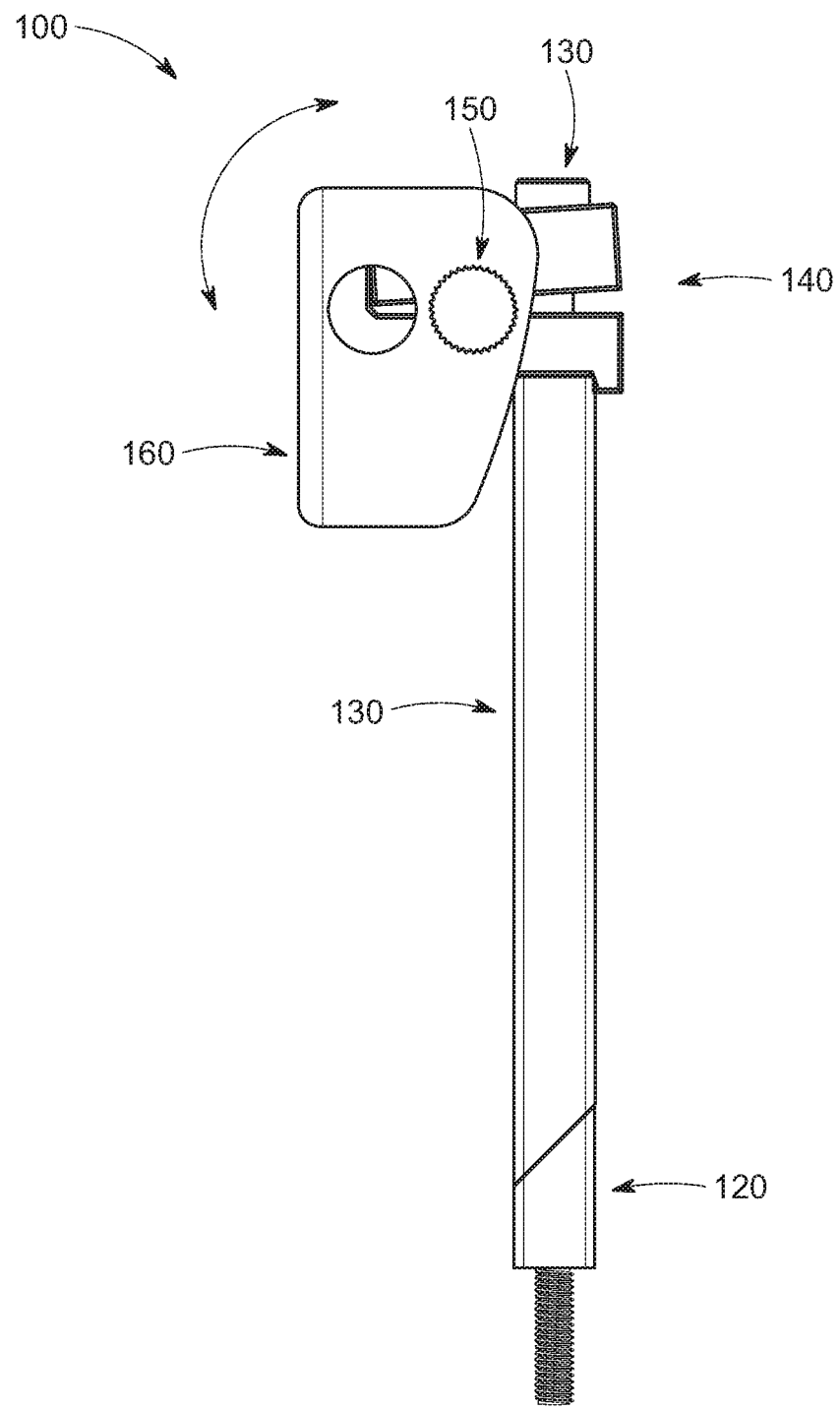
FIG. 6B illustrates a perspective view of an assembled adjustable clamp and tube in a loosened position.

FIGS. 6A and 6B show a side view of the adjustable clamp and tube assembly 100 to illustrate the mechanism that allows that assembly to slide up and down. Preferably, the M8 long bolt 130 positioned at the top of the assembly may be tightened or loosened to provide the means by which the user may slide the assembly 100 up or down. Typically, the loosened position is illustrated in FIG. 6B wherein the threaded jam rod 120 sits in a straight line with the SQ tube

110. In this position, the assembly may be moved up or down within the receiving shaft 210 of the mounting bracket 200 (which is shown in FIG. 1B.) The tightened or secured position is shown in FIG. 6A, wherein the threaded jam rod 120 is in a pivot position such that it does not sit in a straight line with the SQ tube 110. In this position, the threaded jam rod 120 pushes against the receiving shaft 210 of the mounting bracket 200 and inhibits movement of the assembly 100. Ideally, the M8 long bolt 130 may be turned clockwise or counterclockwise respectively, to tighten or loosen the threaded jam rod 120. The sliding movement essentially allows the user to lengthen or shorten the assembly to their preference. Additionally, the tightening or loosening of the M8 long bolt 130 also tightens and loosens the hinged clamp assembly 140. Loosening of the hinged clamp assembly 140 substantially allows the tilting bracket 160 to tilt back and forth with the rotation of the splined shaft 150 within the hinged clamp 140 as shown in FIG. 6B. The movement is preferably achieved when the M8 long bolt 130 loosens the hinged clamp 140 and subsequently allows the splined shaft 150 to disengage from the grooves or teeth in the top hinged member and rotate within the clamp. Likewise, the splined shaft 150 may be secured in place by engaging with the teeth or grooves in the hinged clamp.

Figure 7:
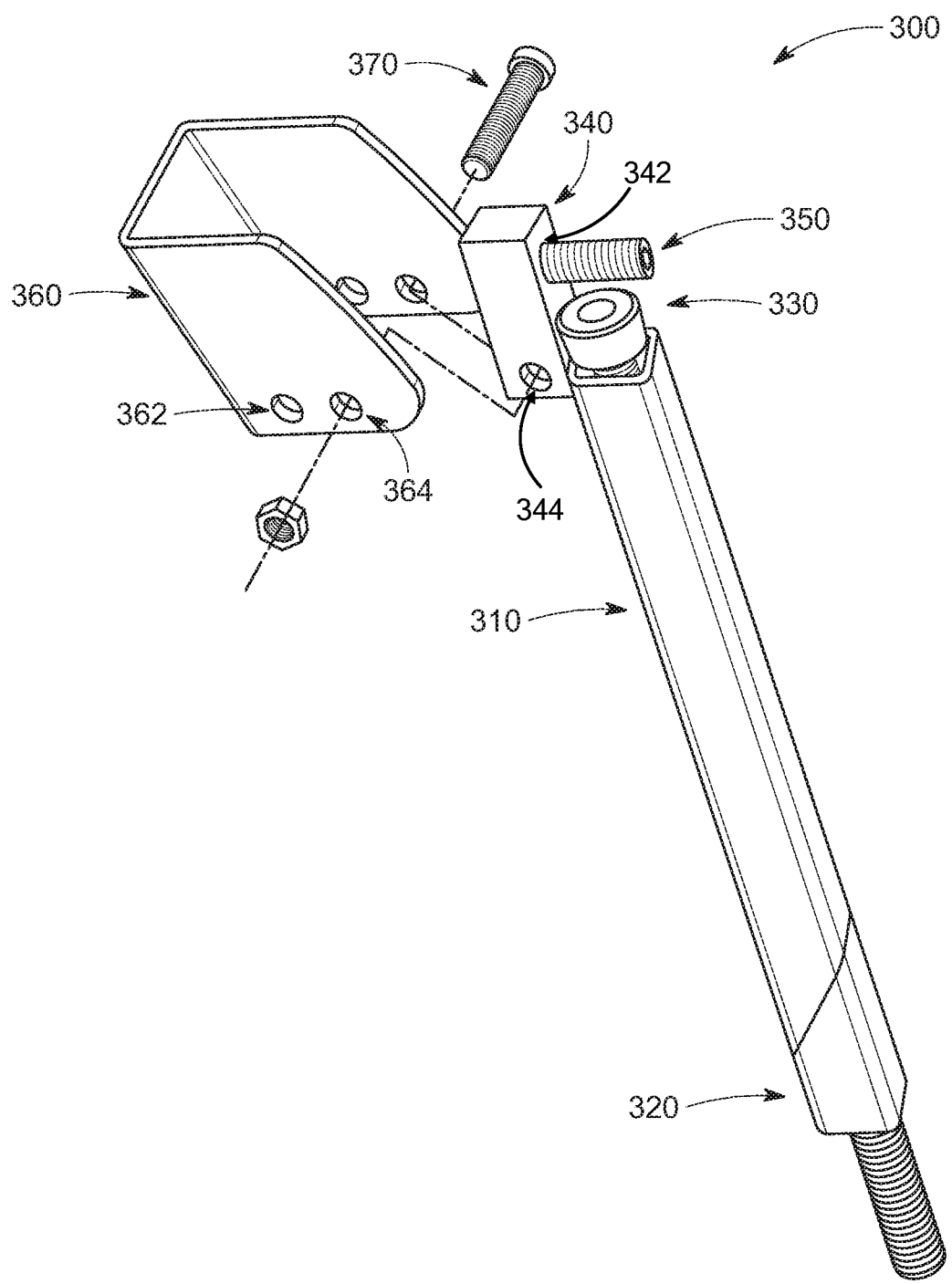
FIG. 7 illustrates an exploded view of an alternate embodiment of an adjustable assembly.

In an alternatively preferred embodiment, FIG. 7 illustrates a tilting bracket and tube 300. In this embodiment, the hinged collar 140 from the previous embodiment may be substituted for a small solid rod 340 with an M6 bolt 350. The small solid rod 340 may preferably be fashioned from the same metal and geometric shape as the SQ tube 310 and be integrated to one flat side on the top end of the SQ tube 310 by any acceptable means known in the arts, including and not limited to welding. Other embodiments for the small solid rod may include and is not limited to a small solid tube. The M8 bolt 330 may preferably be positioned directly on and through the top opening of the SQ tube 310 such that the head of the bolt rests on the top and the bottom end of M8 bolt 330 screws into the threaded jam rod 320. The small solid rod 340 is fashioned with two perpendicular circular openings near the top and bottom of the rod and run the width of the rod. The small solid rod 340 integrated to the SQ tube 310 such that the opening near the top sits above the M8 bolt 330 and extends through from the front to the back of the small solid rod 340. The second opening is near the bottom and extends through the rod perpendicular to the top opening.

The tilting bracket 360, as shown in FIG. 7, is similar to the first preferred embodiment (as shown in FIG. 1.) The tilting bracket 360 is positioned such that it envelops the small solid rod 340 and may be mounted and held in place by a screw 370 positioned through either of the openings 362, 364 in the tilting bracket 360 and the bottom opening 344 of the small solid rod 340. The tilting bracket 360 is positioned and held in place such that it may pivot at the attachment site. The M6 bolt 350 is positioned through the first opening 342 such that the end of the M6 bolt 350 that screws through the small solid rod 340 rests against the inside surface of the tilting bracket 360. By having the M6 bolt 350 rest against the inside surface of the tilting bracket 360, the M6 bolt 350 may be the means by which the tilting bracket 360 is tilted backward or forward. Turning the M6 bolt 350 clockwise or counterclockwise moves the M6 bolt 350 inward toward the tilting bracket or outward away from the tilting bracket 360, such that the tilting bracket 360 moves along with the M6 bolt 350 to rest against the end of the M6 bolt 350.

In this embodiment, the tilting bracket and tube assembly 300 shown in FIG. 7 may slide into the same mounting bracket 200 shown in FIG. 1B. The upward and downward movement of the assembly follows the description in the first embodiment above using the M8 bolt 330.

Figure 9:
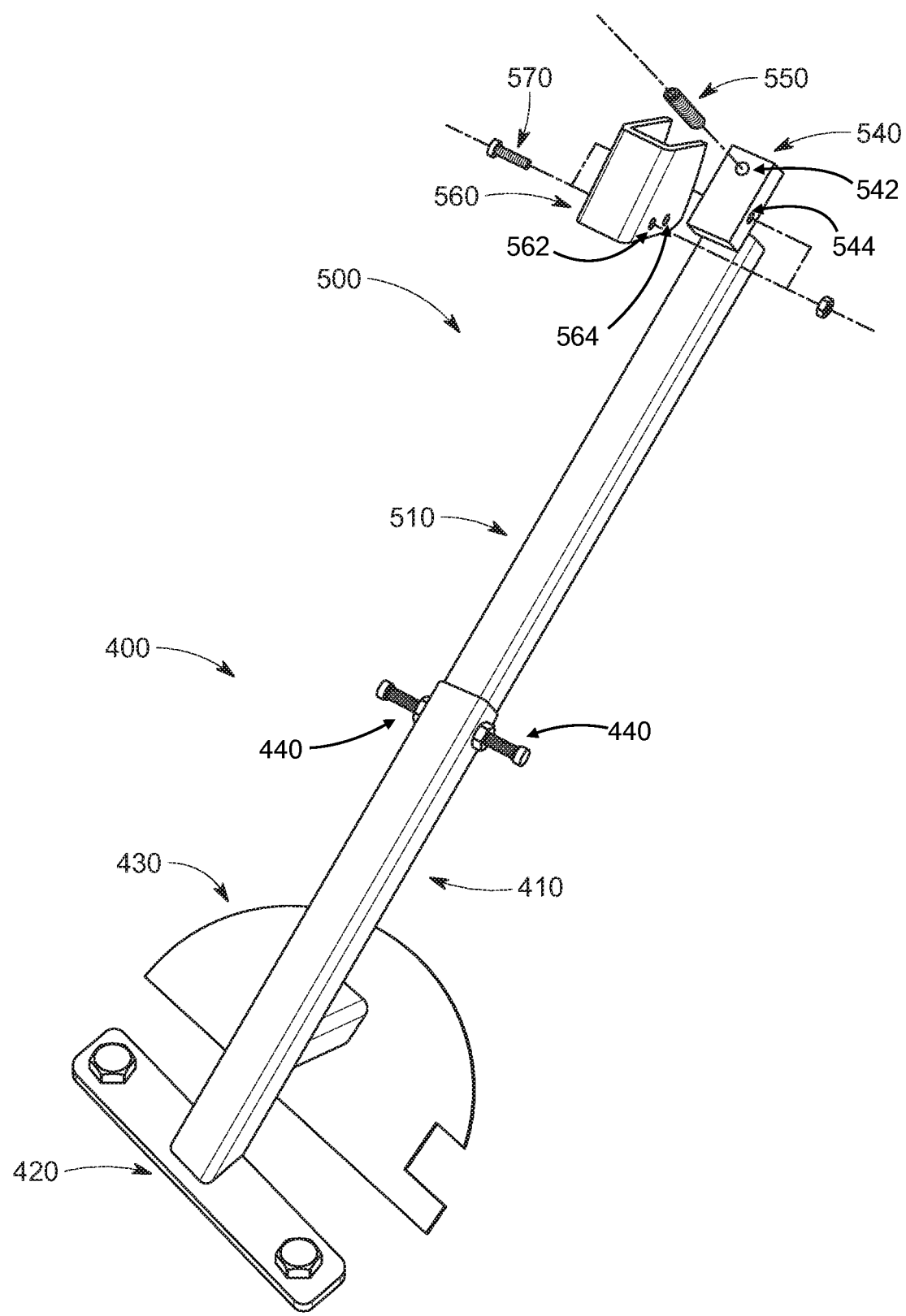
FIG. 9 illustrates a perspective view of an alternate embodiment of a mounting bracket and adjustment assembly.

In another embodiment, a mounting bracket 400 with a tilting bracket and tube assembly 500 is shown in FIG. 9. In this alternate embodiment, the mounting bracket 400 has a similar arrangement which includes a receiving shaft 410, a front plate 420, and a back plate 430. However, the receiving shaft 410 of the mounting bracket 400 is substituted with a receiving shaft 410 that has two M6 bolts 440 positioned in holes on opposite sides of each other near the top of the receiving shaft 410. These two M6 bolts 440 are preferably placed on the sides of the receiving shaft 410 which will not face the front or back of the motorcycle. A long tube 510 of the tilting bracket and tube assembly 500 which may be substantially similar to the length and complementary in shape to the receiving shaft 410 may be positioned within the receiving shaft. The long tube 510 may be fashioned of any substantially strong material and may be solid or hollow, and be of any length that allows the tube to sit within the receiving shaft 410 stably and provide the length to move the backrest to the preferred position. The M6 bolts 440 on the receiving shaft 410 may be the means by which the long tube is adjusted in the upward and downward position by sliding up or down. The long tube 510 is held in place by the M6 bolts 440 pushing against it on opposite sides. Loosening the M6 bolts 440 allows the long tube 510 to be moved within the receiving shaft. The tilting bracket 560 is positioned such that it envelops the small solid rod 540 and may be mounted and held in place by a screw 570 positioned through either of the openings 562, 564 in the tilting bracket 560 and the bottom opening 544 in the small solid rod 540. An additional M6 bolt 550 is positioned through a top opening 542 in the small solid rod 540 such that the end of the M6 bolt 550 that screws through the small solid rod 540 rests against the inside surface of the tilting bracket 560. The turning of the M6 bolt 550 will function in substantially the same way as described in the above embodiment shown in FIG. 7.

Figure 10:
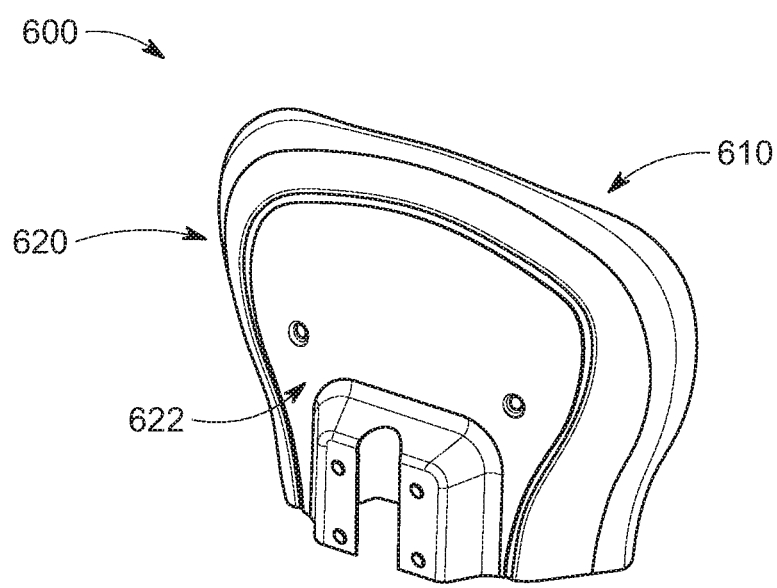
FIG. 10 illustrates a back view of a backrest.

A preferred embodiment of a backrest is illustrated in FIG. 10. In this non-limiting embodiment, a backrest 600 is shown which has a front side 610 and a back side 620. The front side 610 corresponds to the front of the motorcycle. The front side 610 of the backrest 600 is intended to be the place where the rider rests his back while sitting on the motorcycle. The front side 610 may be comprised of an inner and outer material. This inner material is present to add a padding which may include and not be limited to foam or other suitable material known in the arts. The outer material is the cover and may be made of any suitable material such as and not limited to leather, leatherette, and other material known in the arts. The back side 620 of the backrest 600 corresponds to the back of the motorcycle. The back side 620 may include a plate 622 to cover the back. The plate 622 may be made of any sturdy material including and not limited to metal, hard plastic, and other suitable material known in the arts. The plate 622 may be designed with a hollowed-out section that extends outward from the back side 622. This hollowed out section would include a long tube like opening along the back side 622 which extends outward. The hollowed-out design with the opening is fashioned to accommodate the backrest adjustment assembly with the tilting bracket (as shown in FIG. 11 and discussed below).

Figure 8:
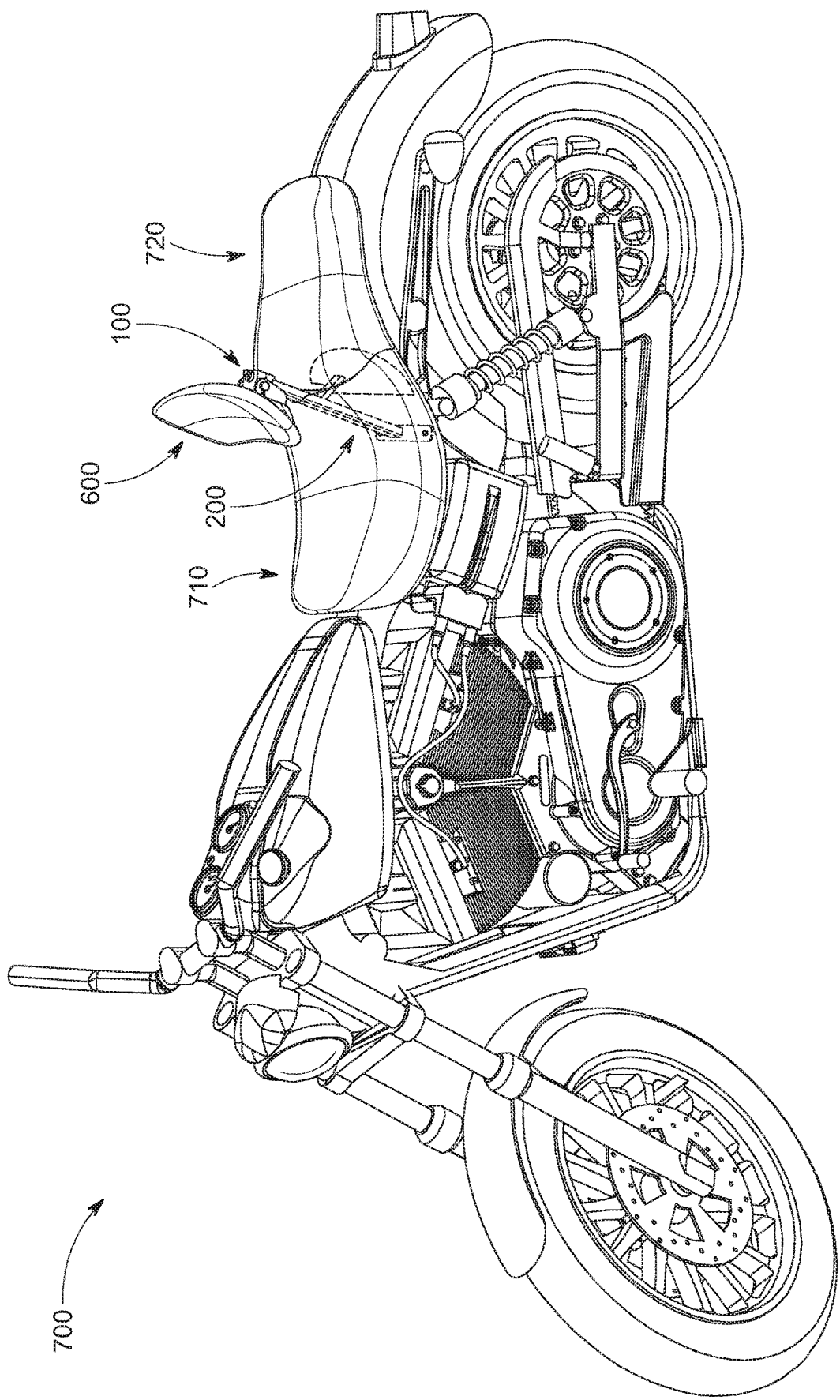
FIG. 8 illustrates a perspective view of an adjustable backrest assembly on a motorcycle.
Figure 11:
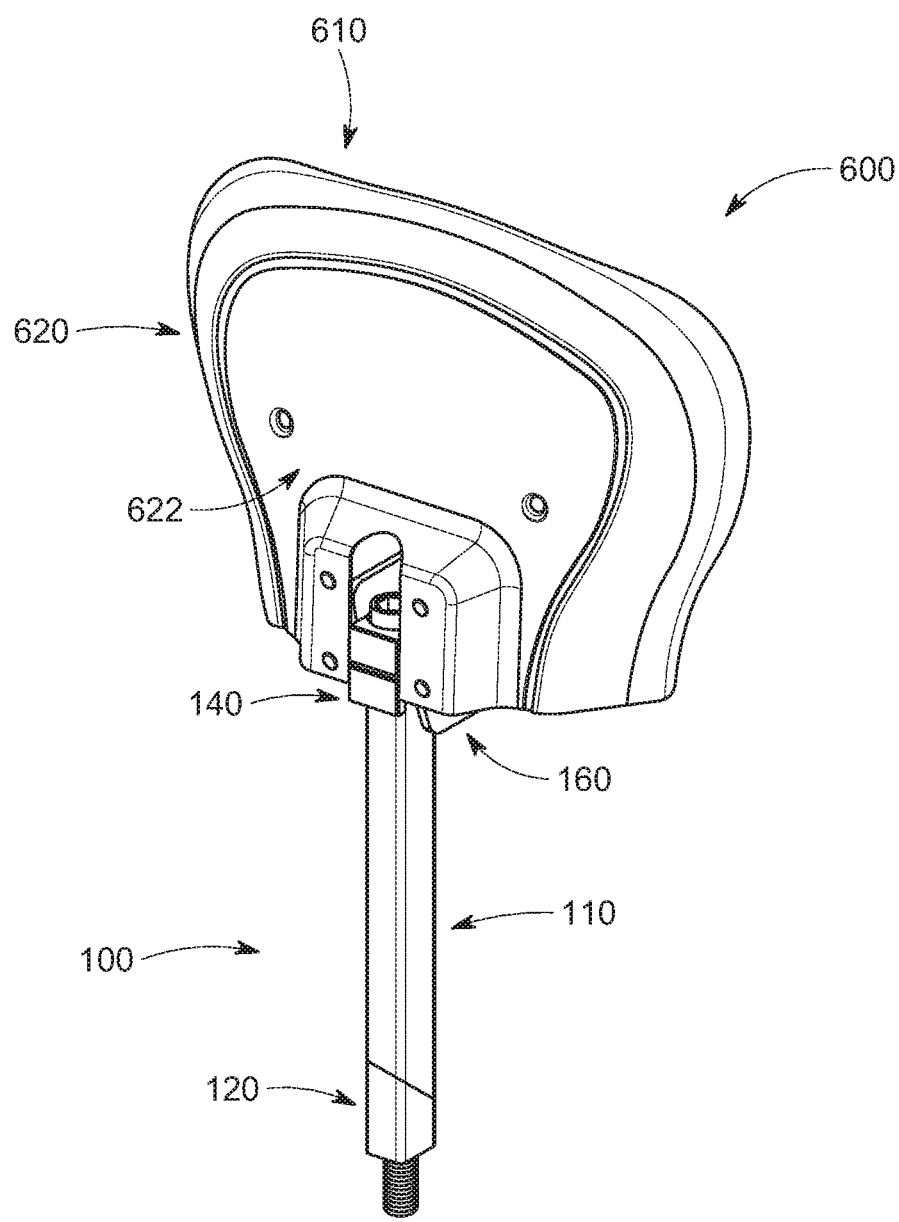
FIG. 11 illustrates a perspective view of an adjustable clamp and tube assembly attached to a backrest.

FIGS. 11 and 8 show a perspective view of the preferred embodiment attached to a backrest and mounted to a motorcycle, respectively. A backrest 600, as shown in FIG. 11, may be connected to the backrest assembly with the tilting bracket 160. Ideally, the flat back part of the tilting bracket 160 may be affixed to the surface on the back side 620 of the backrest 600. The attachment means may include and is not limited to the tilting bracket 160 being welded to the back surface on the back side 620 of backrest 600. Other attachment means may include being bolted on, or any other acceptable means known in the art. FIG. 8 illustrates a motorcycle 700 with the assembled adjustable clamp and tube 100, the backrest 600, and the mounting bracket 200. In this illustration the mounting bracket 200 is attached to the motorcycle 700, wherein the mounting bracket 200 is attached to the frame of the motorcycle 700 and extends up from an opening between the front seat 710 and back seat 720 of the motorcycle 700.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. An adjustable backrest apparatus for adjusting a height and a tilt of a backrest of a motorcycle, the apparatus comprising:
    a mounting bracket having a front mounting member, a rear mounting member, and a connecting member that connects the front and rear mounting members, wherein each mounting member is configured to rest on a motorcycle frame, and the front mounting member has a hollow member that extends upward and away from the motorcycle frame;
    a hollow rod having a proximal end and a distal end, wherein the distal end of the rod is configured to slide into and out of the hollow member of the front mounting member such that the distal end rests inside the front mounting bracket and the proximal end extends upward and out of the hollow member of the front mounting member;
    a threaded jam rod that abuts the distal end of the hollow rod, with the threaded jam rod positioned within the hollow member of the front mounting member;
    a hinged clamp having a top member, a bottom member, wherein each of the top and bottom members has a hole through which a bolt can pass, a hinge connecting the top member to the bottom member, and wherein the bottom member is configured to sit over the distal end of the rod;
    a splined shaft that sits between the top and bottom members of the hinged clamp and extends out from a right and a left side of each of the top and bottom members;
    a long bolt having a proximal end and a distal end, the long bolt configured to traverse downward from its proximal end to its distal end through the holes in the top and bottom members of the hinged clamp, an interior of the hollow rod, an interior of the hollow member of the front mounting member, and the threaded jam rod, wherein the distal end of the long bolt has threads that fit into the threaded jam rod;
    a tilting bracket positioned around the left and right outer sides of the hinged clamp, the tilting bracket having a front side which lies adjacent and perpendicular to the hinge of the hinged clamp, a left side and right side which respectively envelop the left and right outer sides of the hinged clamp, and receiving holes on each of the left and right sides which received the splined shaft that extends out from the hinged clamp and through the holes on the left and right sides of the tilting bracket; and
    a backrest having a front side and a rear side, wherein the rear side of the backrest is attached to the front side of the tilting bracket.

2. The adjustable backrest apparatus of claim 1, wherein the top member of the hinged clamp has grooves that engage the splined shaft.

3. The adjustable backrest apparatus of claim 1, wherein the bottom member of the hinged clamp has a smooth surface that engages the splined shaft.

4. The adjustable backrest apparatus of claim 1, wherein the front mounting member of the mounting bracket is fastened to the motorcycle frame.

5. The adjustable backrest apparatus of claim 1, wherein the back mounting member of the mounting bracket is fastened to the motorcycle frame.

6. The adjustable backrest apparatus of claim 1, wherein the front mounting member of the mounting bracket is fastened to the motorcycle frame, and the back mounting member of the mounting bracket rests against a fender of the motorcycle.

7. The adjustable backrest apparatus of claim 6, wherein the back mounting member of the mounting bracket has a bottom surface that rests against the fender, and the bottom surface is comprised of a non-scratch material that does not scratch the fender.

8. The adjustable backrest apparatus of claim 1, wherein the hollow member of the front mounting bracket and the hollow rod have a cross section selected from the group consisting essentially of a rectangular cross section, a circular cross section, a triangular cross section, a trapezoidal cross section, a polygonal cross section, and an oval cross section.

9. The adjustable backrest apparatus of claim 1, wherein the rear side of the backrest attached to the tilting bracket is adapted with a portion extending outward and away from the rear side of the backrest to envelop the tilting bracket.

10. The adjustable backrest apparatus of claim 1, wherein the distal end of the long bolt has a head configured as a stop guard that abuts the hinged collar to prevent the hinged collar from moving upwards.

11. The adjustable backrest apparatus of claim 1, wherein the tilting bracket has two or more series of holes on the left and right sides to allow adjustment of a distance between the front of the tilting bracket and the hinged clamp.

12. An adjustable backrest apparatus for adjusting a height and a tilt of a backrest of a motorcycle, the apparatus comprising:
- a mounting bracket having a front mounting member, a rear mounting member, a connecting member positioned between the front and rear mounting members, and a vertically oriented hollow member that extends upward and away from the front and rear mounting members;
- a hollow rod with a proximal end and distal end, wherein the proximal end of the hollow rod is slidingly engaged with the vertically oriented hollow member of the mounting bracket;
- a threaded expander rod that abuts the proximal end of the rod inside the vertically oriented hollow member of the mounting bracket;
- a hinged clamp that abuts the distal end of the hollow rod, the hinged clamp having a top member, a bottom member, and hinge that connects the top and bottom members;
- a splined shaft that sits between the top and bottom member of the hinged clamp and extends out a right side and a left side of the top and bottom members;
- a long bolt with a proximal end and a distal end, wherein the long bolt passes through the hinged clamp, the hollow rod, and the threaded expander rod, such that the proximal end of the long bolt abuts the hinged clamp, and the distal end of the long bolt threads into the threaded expander rod;
- a tilting bracket that rotatably is positioned around the hinged clamp, wherein the splined shaft sequentially passes through a right side of the tilting bracket, the right side of the hinged clamp, the left side of the hinged clamp, and a left side of the hinged clamp; and
- a backrest having a front side and a rear side, wherein the rear side of the backrest is attached to the front side of the tilting bracket.

13. The adjustable backrest apparatus of claim 12, wherein the top member of the hinged clamp has grooves that engage the splined shaft.

14. The adjustable backrest apparatus of claim 12, wherein the bottom member of the hinged clamp has a smooth surface that engages the splined shaft.

15. The adjustable backrest apparatus of claim 12, wherein the rear side of the backrest attached to the tilting bracket is adapted with a portion extending outward and away from the rear side of the backrest to envelop the tilting bracket.

16. The adjustable backrest apparatus of claim 12, wherein the front mounting member of the mounting bracket is fastened to the motorcycle frame, and the back mounting member of the mounting bracket rests against a fender of the motorcycle.

17. The adjustable backrest apparatus of claim 12, wherein the front mounting member of the mounting bracket is fastened to the motorcycle frame, and the back mounting member of the mounting bracket rests against a fender of the motorcycle.

18. The adjustable backrest apparatus of claim 17, wherein the back mounting member of the mounting bracket has a bottom surface that rests against the fender, and the bottom surface is comprised of a non-scratch material that does not scratch the fender.

19. The adjustable backrest apparatus of claim 12, wherein the distal end of the bolt has a head configured as a stop guard that abuts the hinged collar to prevent the hinged collar from moving upwards.

20. The adjustable backrest apparatus of claim 12, wherein parts of the backrest apparatus are fashioned from a material selected from the group consisting essentially of steel, aluminum, metal alloys, plastic, a resin, and combinations thereof.

* * * * *

UNITED STATES PATENT AND TRADEMARK OFFICE
CERTIFICATE OF CORRECTION

PATENT NO. : 10,661,849 B1  
APPLICATION NO. : 16/693279  
DATED : May 26, 2020  
INVENTOR(S) : Billy Huu Le Page 1 of 1

It is certified that error appears in the above-identified patent and that said Letters Patent is hereby corrected as shown below:

On the Title Page

Item (74) Attorney, Agent, or Firm has been misspelled. Please change it to read Binita Singh, not Bonita Singh.

Signed and Sealed this  
First Day of September, 2020

Andrei Iancu  
*Director of the United States Patent and Trademark Office*